(12) United States Patent
Fukuzawa

(10) Patent No.: US 7,027,281 B2
(45) Date of Patent: Apr. 11, 2006

(54) FAILURE DETECTING DEVICE

(75) Inventor: Yousuke Fukuzawa, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 540 days.

(21) Appl. No.: 10/298,935

(22) Filed: Nov. 19, 2002

(65) Prior Publication Data

US 2003/0182989 A1   Oct. 2, 2003

(30) Foreign Application Priority Data

Mar. 29, 2002   (JP) .............................. 2002-096103

(51) Int. Cl.
*H02H 3/00* (2006.01)

(52) U.S. Cl. ...................................... 361/100; 361/115
(58) Field of Classification Search ................... 361/65, 361/100, 58, 115, 78
See application file for complete search history.

(56) References Cited

U.S. PATENT DOCUMENTS 5,448,492 A * 9/1995 Kolomyski et al. ......... 700/293

FOREIGN PATENT DOCUMENTS

| JP | 05-310060 | 11/1993 |
|----|-----------|---------|
| JP | 10-144194 | 5/1998 |
| JP | 2987446 | 10/1999 |

* cited by examiner

Primary Examiner—Stephen W. Jackson
(74) Attorney, Agent, or Firm—Sughrue Mion, PLLC

(57) ABSTRACT

A failure detecting device is provided, which includes the transistor for driving the excitation coil of the relay connected to the battery, the power supply monitors for monitoring an output of the relay, the EEPROM for storing failure presence or absence information, and the microcomputer for writing the failure presence or absence information in the EEPROM at the time of power OFF, reading the failure presence or absence information from the EEPROM at the time of power ON, and judging a failure state based on a voltage value detected by the power supply monitor in the case in which a failure is present.

8 Claims, 15 Drawing Sheets

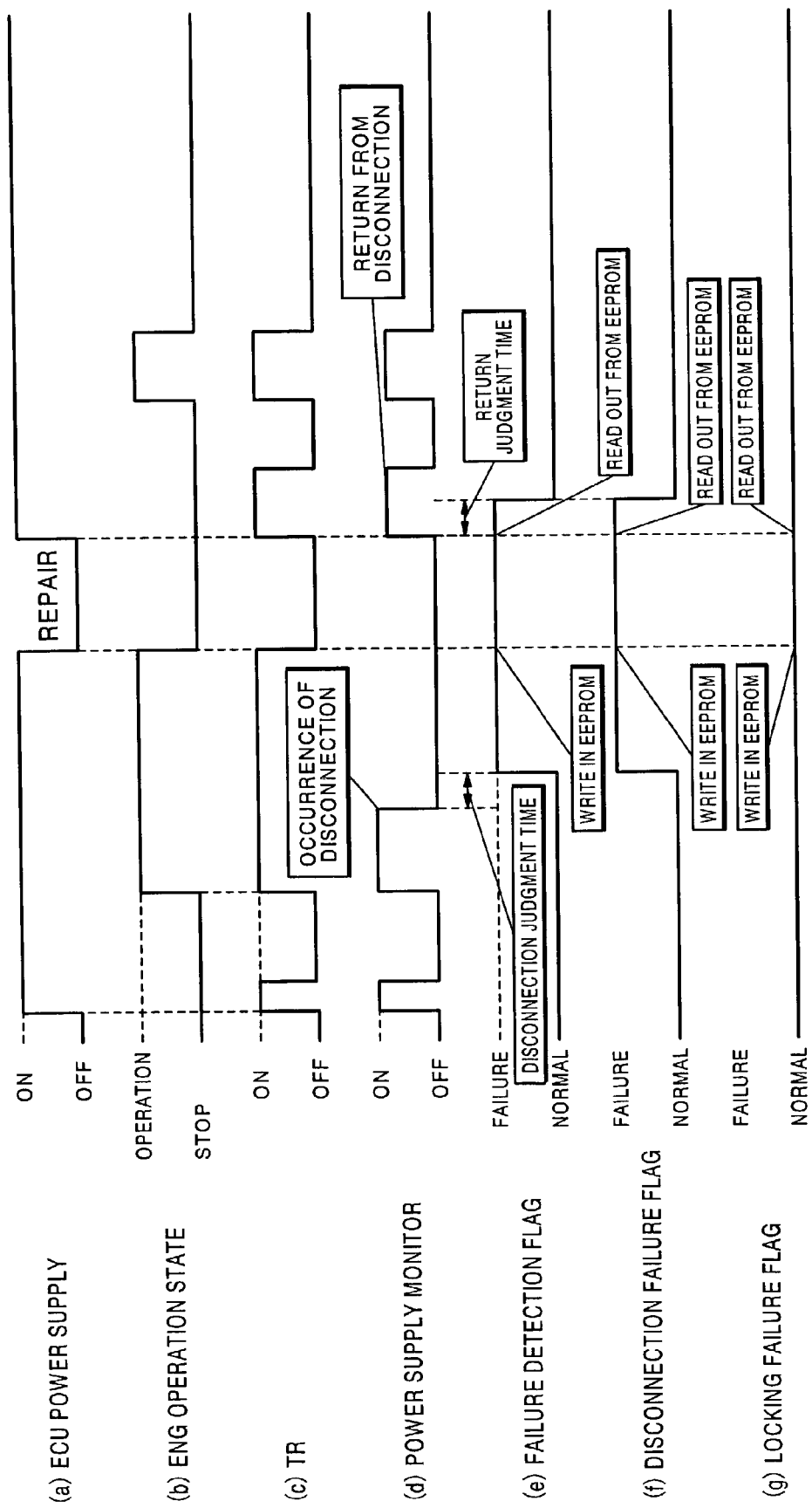

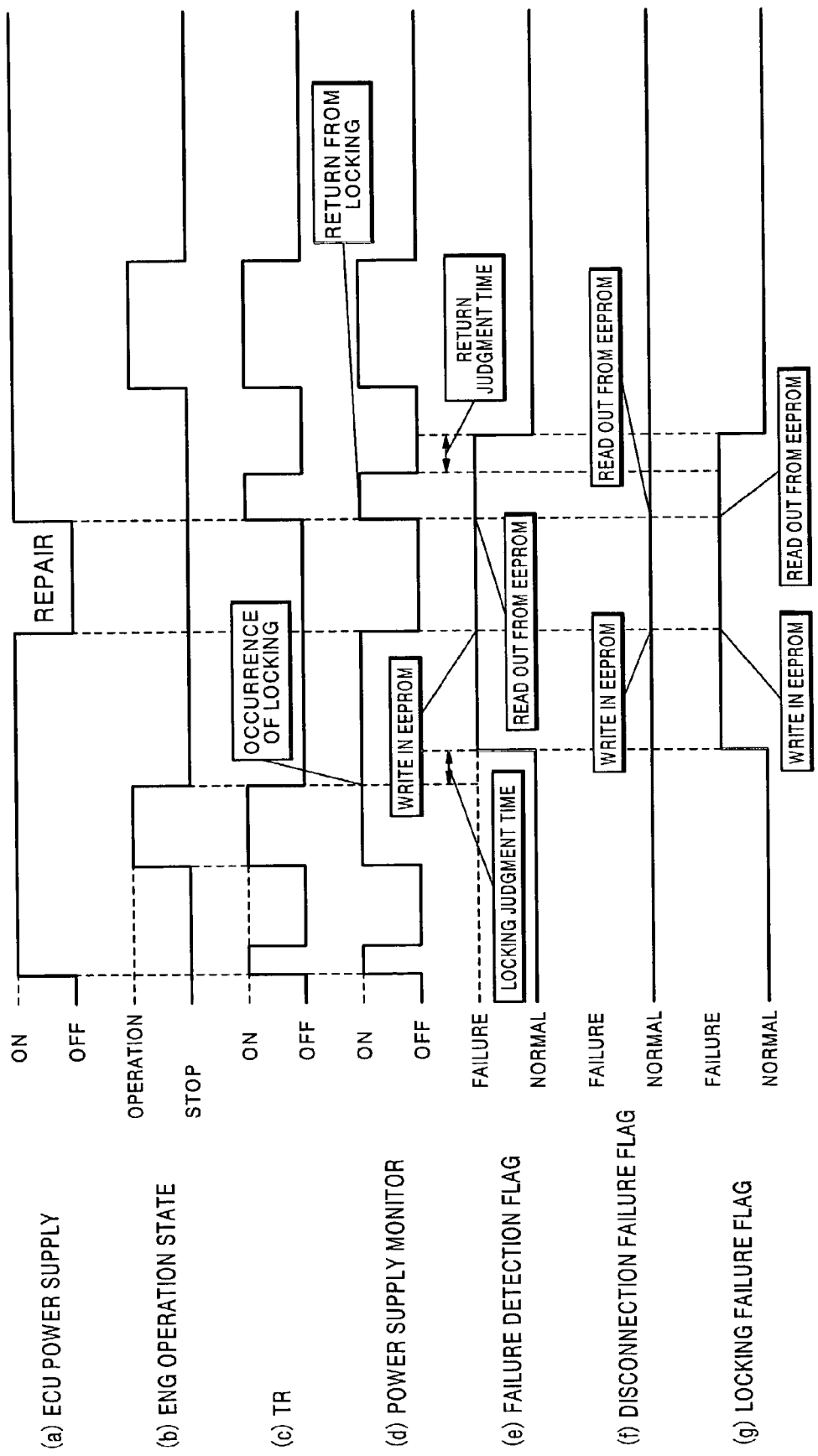

FAILURE DETECTING DEVICE

BACKGROUND OF THE INVENTION

1. Field of the Invention

The present invention relates to a failure detecting device for a fuel injection control unit of, for example, a multi-cylinder V-type internal combustion engine. If a fuel injection control unit is out of order due to locking (freezing) or the like, since fuel is suppliable to an engine, danger of fire or the like occurs. In addition, since it becomes impossible to actuate an engine at the time of disconnection, detection of a failure is necessary.

2. Description of the Related Art

A conventional failure detecting device will be described with reference to a drawing. FIG. 8 is a diagram showing a structure of the conventional failure detecting device.

In FIG. 8, reference numeral 1 denotes a battery (power supply: e.g., 12V); 2, a relay having an excitation coil and a contact; 3, an ECU (Electronic Control Unit); and 4, an injector. In addition, reference numeral 31 denotes a transistor (TR); 32 and 33, resistances for dividing a voltage (power supply monitor); 34, a microcomputer (arithmetic unit); and 35, a transistor. Moreover, reference numeral 341 denotes an EEPROM (memory device).

Next, operations of the conventional failure detecting device will be described with reference to drawings.

In order to judge return from a failure without wrong detection, it is necessary to store two kinds of information, "presence or absence of a failure" and "state of a failure", in the EEPROM (memory device) 341.

FIG. 9 is a timing chart showing basic operations of the failure detecting device.

The transistor (TR) 31 of FIG. 8 is ON for a fixed time simultaneously with application of a power supply of the ECU 3 and drives the relay 2. As indicated by (c) in FIG. 9, the transistor 31 is turned OFF after the fixed time has elapsed. In addition, as indicated by (b) and (c) in FIG. 9, when a rotation signal of an engine is inputted (not shown) and the microcomputer 34 judges that the engine is in operation, the microcomputer 34 turns ON the transistor 31 again and drives the relay 2. When the engine stops, the microcomputer 34 turns OFF the transistor 31. If a circuit is normal, variation of a voltage occurs in the power supply monitor (a connection point of the resistances 32 and 33) in association with the operation of the transistor 31. In the case of the above operation state, the relay 2 and a peripheral circuit are in a normal state.

FIG. 10 is a timing chart showing detection of locking and a return logic of the conventional failure detecting device.

As indicated by (d) in FIG. 10, when the relay 2 is locked, the power supply monitor continues to be in an ON state. When an engine rotation signal disappears and the microcomputer 34 judges that the engine has stopped, the microcomputer 34 turns OFF the transistor 31. However, since the relay 2 is locked, the power supply monitor is not turned OFF.

When this state continues for a predetermined time (locking judgment time), the microcomputer 34 judges that locking has occurred. When the engine is actuated again, the transistor 31 is turned ON and the power supply monitor is ON. Thus, the microcomputer 34 can judge the failure detecting device is in the normal state. However, since the failure detecting device is out of order due to locking, the microcomputer 34 does not return the failure detecting device to normal because returning the failure detecting device to normal according to ON of the transistor 31 and ON of the power supply monitor leads to misjudgment.

As shown in FIG. 10, when the engine is stopped again, the transistor 31 is turned OFF and the power supply monitor is turned OFF, the microcomputer 34 judges that the failure detecting device has returned to normal after a predetermined time (return judgment time).

FIG. 11 is a timing chart showing detection of disconnection and a return logic of the conventional failure detecting device.

As indicated by (d) in FIG. 11, when the peripheral circuit of the relay 2 is disconnected, the power supply monitor continues to be in an OFF state. When the peripheral circuit of the relay 2 is disconnected during operation of the engine, the power supply monitor is turned OFF. When this state continues for a predetermined time (disconnection judgement time), the microcomputer 34 judges that disconnection has occurred.

When the engine stops and the transistor 31 is turned OFF, the microcomputer 34 can judge that the failure detecting device is normal according to OFF of the transistor 31 and OFF of the power supply monitor. However, since the failure detecting device is out of order due to disconnection, the microcomputer 34 does not return it to normal because returning it to normal in this state leads to misjudgment.

As shown in FIG. 11, when the engine operates again, the transistor 31 is turned ON and the power supply monitor continues to be ON for a predetermined time (return judgment time), the microcomputer 34 judges that the failure detecting device has returned to normal.

FIG. 12 is a timing chart showing operations at the time when the conventional failure detecting device is turned OFF in a disconnection state. In addition, FIG. 13 is a timing chart showing operations at the time when the conventional failure detecting device is turned OFF in a locked state.

As described in FIGS. 10 and 11, it is necessary to hold a failure state in order not to mistake judgment of return from a failure. This means that it is necessary to also hold the failure state continuously when the power supply of the ECU 3 changes from ON to OFF to ON.

FIG. 12 is a timing chart showing operations for holding a disconnection failure at the time when the power supply is turned OFF in a disconnection state and is turned ON again. After the peripheral circuit of the relay 2 is disconnected and a disconnection judgment is established, when a failure occurs or when the power supply of the ECU 3 is turned OFF, the microprocessor 34 causes the EEPROM 341 (memory device) to store information indicating presence or absence of a failure (failure detection flag) and information indicating that the failure detecting device is out of order in a disconnection state (disconnection failure flag).

The microcomputer 34 reads out these information from the EEPROM 341 when the power supply of the ECU 3 is applied again and holds the state. This operation is represented by flow charts as shown in FIGS. 14 and 15.

That is, as shown in FIG. 15, in step 400, upon detecting that the power supply is turned OFF, the microcomputer 34 stores the failure detection flag, the disconnection failure flag and the locking failure flag in the EEPROM 341.

In addition, as shown in FIG. 14, in step 300, upon detecting that the power supply is turned ON, the microcomputer 34 reads out the failure detection flag, the disconnection failure flag and the locking failure flag from the EEPROM 341.

FIG. 13 is a flow chart showing operations for holding a locking failure at the time when the power supply is turned OFF in a locked state and is turned ON again. As in FIG. 12, the microcomputer 34 stores information on the failure in the EEPROM 341 at the time of locking and takes out the information on the failure at the time when the power supply of the ECU 3 is applied again.

FIGS. 16 and 17 are timing charts showing operations of return judgment at the time when the failure detecting device is repaired from the respective failure states.

FIG. 16 is a timing chart showing operations at the time when a disconnection failure is repaired and the failure detecting device returns from the disconnection state. When the ECU 3 is operated by applying the power supply again and the transistor 31 is ON for a fixed time, since the repair is completed, the power supply monitor is also turned ON. When this state continues for a predetermined time (return judgment time), the microcomputer 34 judges that the failure detecting device has returned to normal. Usually, since ON time of the transistor 31 at the start of operations of the ECU 3 is longer than a predetermined time for return judgment, return judgment ends when the power supply is applied.

FIG. 17 is a timing chart showing operations when a locking failure is repaired and the failure detecting device returns from the locked state. After the ECU 3 is operated by applying the power source again and the transistor 31 is ON for a fixed time, the transistor 31 is turned OFF. At this point, since the repair is completed, the power supply monitor is also turned OFF. When this state continues for a predetermined time (return judgment time), the microcomputer 34 judges that the failure detecting device has returned to normal. In addition, if the engine comes to be in an operation state within a fixed time after the operation of the ECU 3, when the transistor 31 is turned OFF after the engine stops, normal return judgment becomes possible and the failure detecting device returns to normal.

In storing information in a memory device, a mechanism and/or a contrivance is required taking into account an amount of information of the memory device and reliability of the memory device, which increases loads and costs for a system.

For example, in recording information in an EEPROM, in order to prevent miswriting in such a case in which a failure of the EEPROM or power OFF occurs concurrently with writing in the EEPROM, countermeasures for a power supply circuit and a logic for judging miswriting are required, which makes processing complicated and increases loads applied to software. The increase of loads applied to software leads to increase in a program size, verification items of the software and the like.

SUMMARY OF THE INVENTION

The present invention has been devised to solve the above-mentioned problems, and it is an object of the present invention to provide a failure detecting device that is capable of minimizing increase in a memory capacity of a memory device to realize the same functions as the conventional failure detecting device.

According to the present invention, there is provided a failure detecting device including a transistor for driving an excitation coil of a relay connected to a power supply, a power supply monitor for monitoring an output of the relay, a memory device for storing failure presence or absence information and an arithmetic device for writing the failure presence or absence information in the memory device when the power supply is OFF, reading the failure presence or absence information from the memory device when the power supply is ON and judging a failure state based on a voltage value detected by the power supply monitor if a failure is present.

Therefore, there is provided a failure detecting device that is capable of minimizing increase in a memory capacity of a memory device to realize the same functions as a conventional failure detecting device.

BRIEF DESCRIPTION OF THE DRAWINGS

In the accompanying drawings:

FIG. 14 is a flow chart showing operations at the time when the conventional failure detecting device is turned ON;

FIG. 16 is a timing chart showing operations at the time when disconnection of the conventional failure detecting device is repaired; and FIG. 17 is a timing chart showing operations at the time when locking of the conventional failure detecting device is repaired.

DETAILED DESCRIPTION OF THE PREFERRED EMBODIMENTS

First Embodiment

Figure 1:
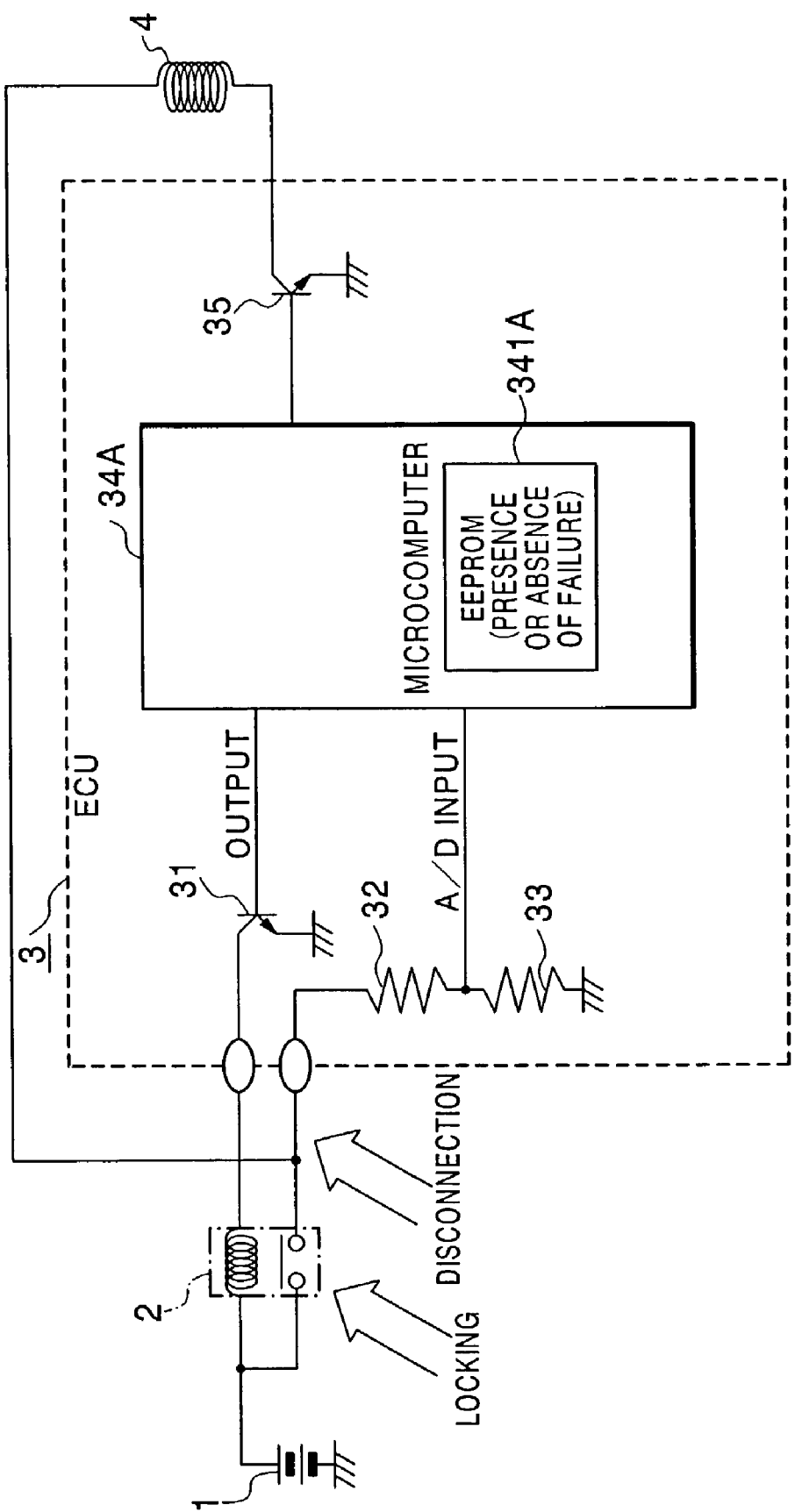
FIG. 1 is a diagram showing a structure of a failure detecting device in accordance with a first embodiment of the present invention.

A failure detecting device in accordance with a first embodiment of the present invention will be described with reference to FIG. 1. FIG. 1 is a diagram showing a structure of the failure detecting device in accordance with the first embodiment of the present invention. Note that, in each figure, identical reference numerals denote identical or equivalent portions.

In FIG. 1, reference numeral 1 denotes a battery (power supply: e.g., 12V); 2, a relay having an excitation coil and a contact; 3, an ECU (Electronic Control Unit); and 4, an injector. In addition, reference numeral 31 denotes a transistor (TR); 32 and 33, resistances for dividing a voltage (power supply monitor); 34A, a microcomputer (arithmetic unit); and 35, a transistor. Moreover, reference numeral 341A denotes an EEPROM (memory device).

Next, operations of the failure detecting device in accordance with the first embodiment will be described with reference to the accompanying drawings.

When the power supply 1 of the ECU 3 is applied again, if information indicating that a failure has occurred is written in the EEPROM 341A, the microcomputer 34A refers to a voltage of the power supply monitor to determine conditions for return.

When the power supply 1 of the ECU 3 changes from ON to OFF to ON in a state in which a failure is not repaired, since a failure state is maintained, the microcomputer 34 reads out information of the EEPROM 341A at the time of turning ON the power supply 1. If the information indicates that a failure has occurred, the microcomputer 34A can judge that the failure detecting device has been out of order in a locked state for some time when a voltage of the power supply monitor is ON. In addition, if a voltage of the power supply monitor is OFF, the microcomputer 34A can judge that the failure detecting device has been out of order in the disconnection state for sometime. Using the idea described before, reduction of an amount of stored information of the EEPROM 341A and a detection logic can be simplified, and loads applied to software can be reduced.

Figure 2:
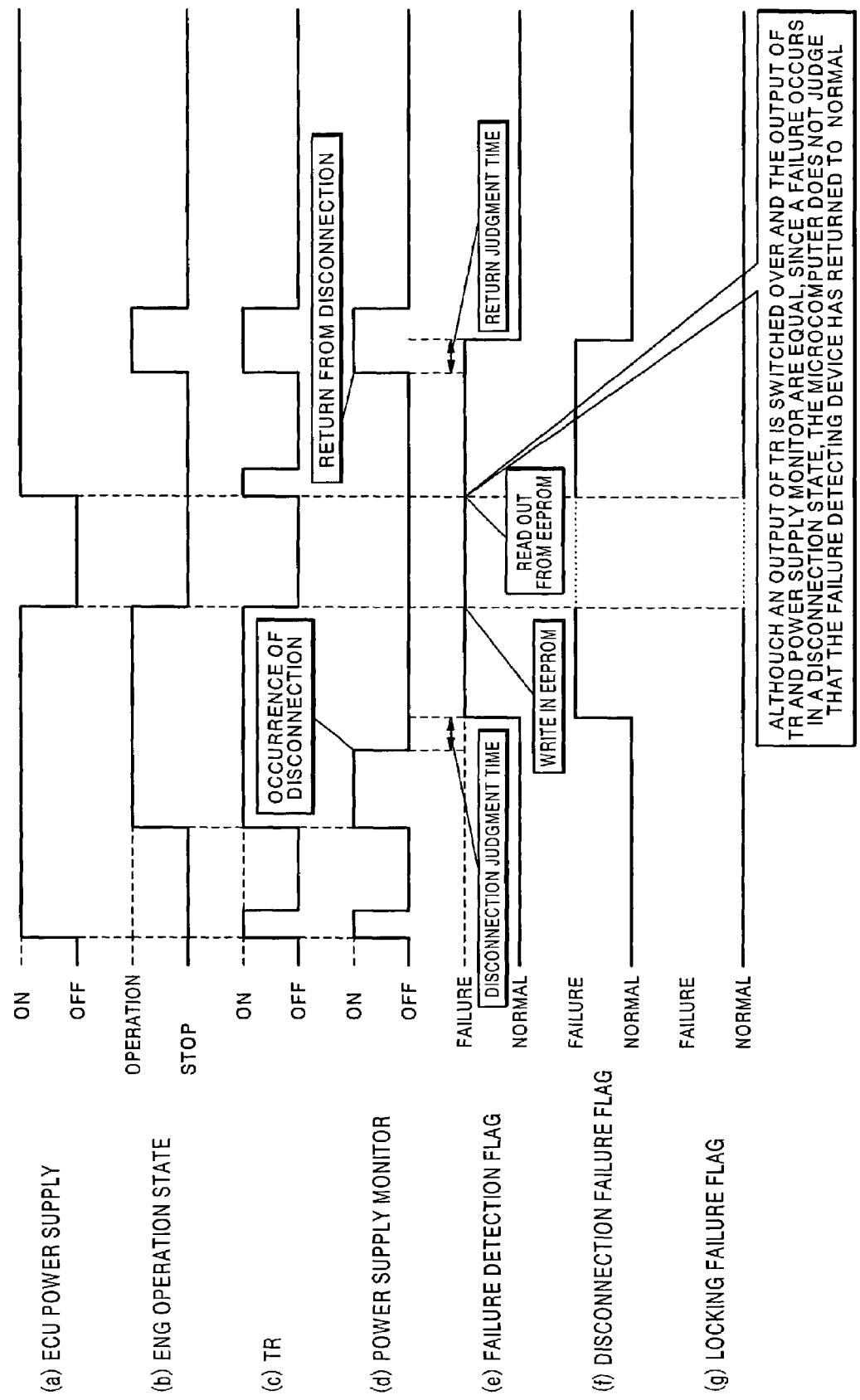
FIG. 2 is a timing chart showing operations at the time when the failure detecting device in accordance with the first embodiment of the present invention is turned OFF in a disconnection state.

FIG. 2 is a timing chart showing operations at the time when the failure detecting device in accordance with the first embodiment of the present invention is turned OFF in the disconnection state.

When disconnection has occurred or when the power supply 1 of the ECU 3 is turned OFF, information to be stored in the EEPROM 341A is information on whether or not a failure has occurred (present or absence of a failure).

As shown in FIG. 2, in the case of the disconnection state, since the voltage of the power supply monitor is continues to be OFF, the microcomputer 34A judges that disconnection has occurred and sets a state in which the transistor 31 is ON and the power supply monitor is ON as conditions for returning to normal. Consequently, the microcomputer 34A never makes a misjudgment when the transistor 31 is OFF to temporarily judge that the failure detecting device is normal instead of judging that it is out of order.

In addition, after temporarily judging that the failure detecting device is normal, when the transistor 31 is turned ON, the microcomputer 34A never judges that the failure detecting device is out of order again and never creates a state in which judgments of failure and normal are repeated. That is, the microcomputer 34A never returns the failure detecting device to normal by mistake.

Figure 3:
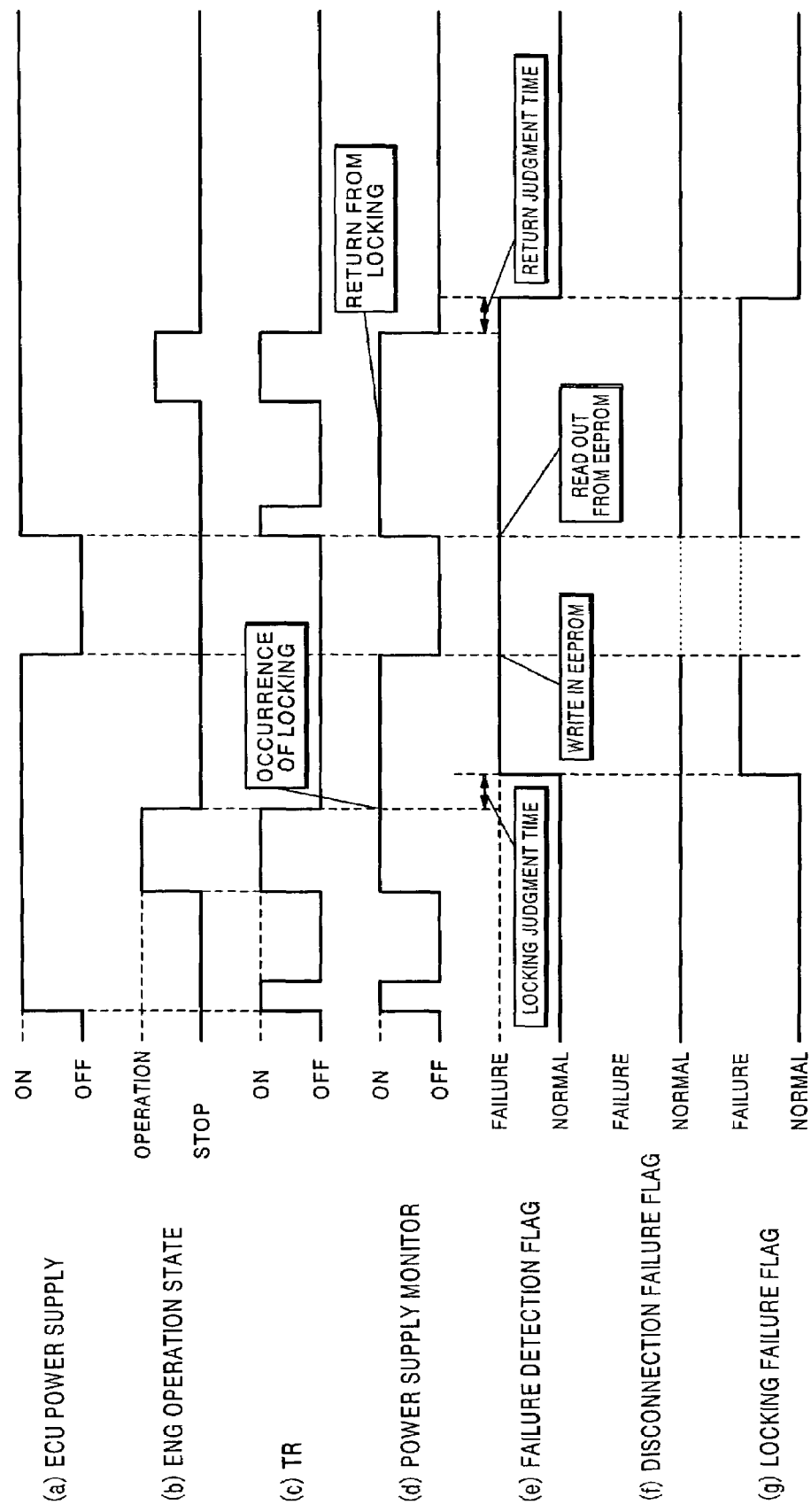
FIG. 3 is a timing chart showing operations at the time when the failure detecting device in accordance with the first embodiment of the present invention is turned OFF in a locked state.

FIG. 3 is a timing chart showing operations at the time when the failure detecting device in accordance with the first embodiment of the present invention is turned OFF in a locked state.

As shown in FIG. 3, since a voltage of the power supply monitor is ON at the time when the power supply 1 of the ECU 3 is applied again in a state in which locking occurs, the microcomputer 34A judges that the failure detecting device is in the locked state and sets a state in which the transistor 31 is OFF and a voltage of the power supply monitor is OFF as conditions for returning to normal. Therefore, the microcomputer 34A never makes a misjudgment at the time when the voltage of the power supply monitor is ON to temporarily return the failure detecting device to normal.

Figure 4:
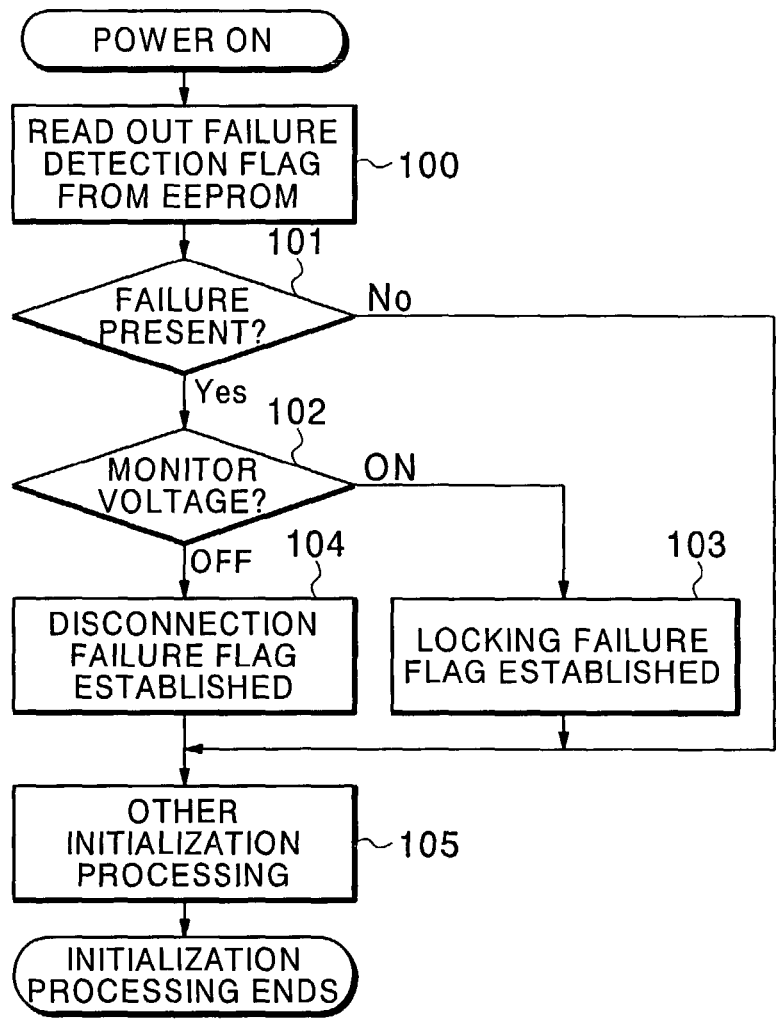
FIG. 4 is a flow chart showing operations at the time when power OFF of the failure detecting device in accordance with the first embodiment of the present invention is detected.

FIG. 4 is a flow chart showing operations at the time when the failure detecting device in accordance with the first embodiment of the present invention is turned ON. In addition, FIG. 5 is a flow chart showing operations at the time when power OFF of the failure detecting device in accordance with the first embodiment of the present invention is detected.

Figure 5:
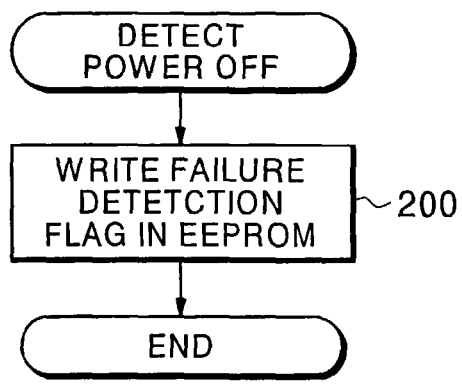
FIG. 5 is a flow chart showing operations at the time when power OFF of the failure detecting device in accordance with the first embodiment of the present invention is detected.

That is, as shown in FIG. 5, in step 200, upon detecting OFF of the power supply 1, the microcomputer 34A stores only a failure detection flag in the EEPROM 341A.

In addition, as shown in FIG. 4, in step 100, upon detecting ON of the power supply 1, the microcomputer 34A reads out the failure detection flag from the EEPROM 341A.

Next, in step 101, the microcomputer 34A judges whether or not a failure is present based on the failure detection flag read out from the EEPROM 341A.

Next, in steps 102 and 103, the microcomputer 34A judges ON or OFF of a voltage of the power supply monitor. If the voltage of the power supply monitor is ON, the microcomputer 34A judges that a locking failure has occurred.

On the other hand, in steps 102 and 104, the microcomputer 34A judges ON or OFF of a voltage of the power supply monitor. If the voltage of the power supply monitor is OFF, the microcomputer 34A judges that a disconnection failure has occurred.

Figure 6:
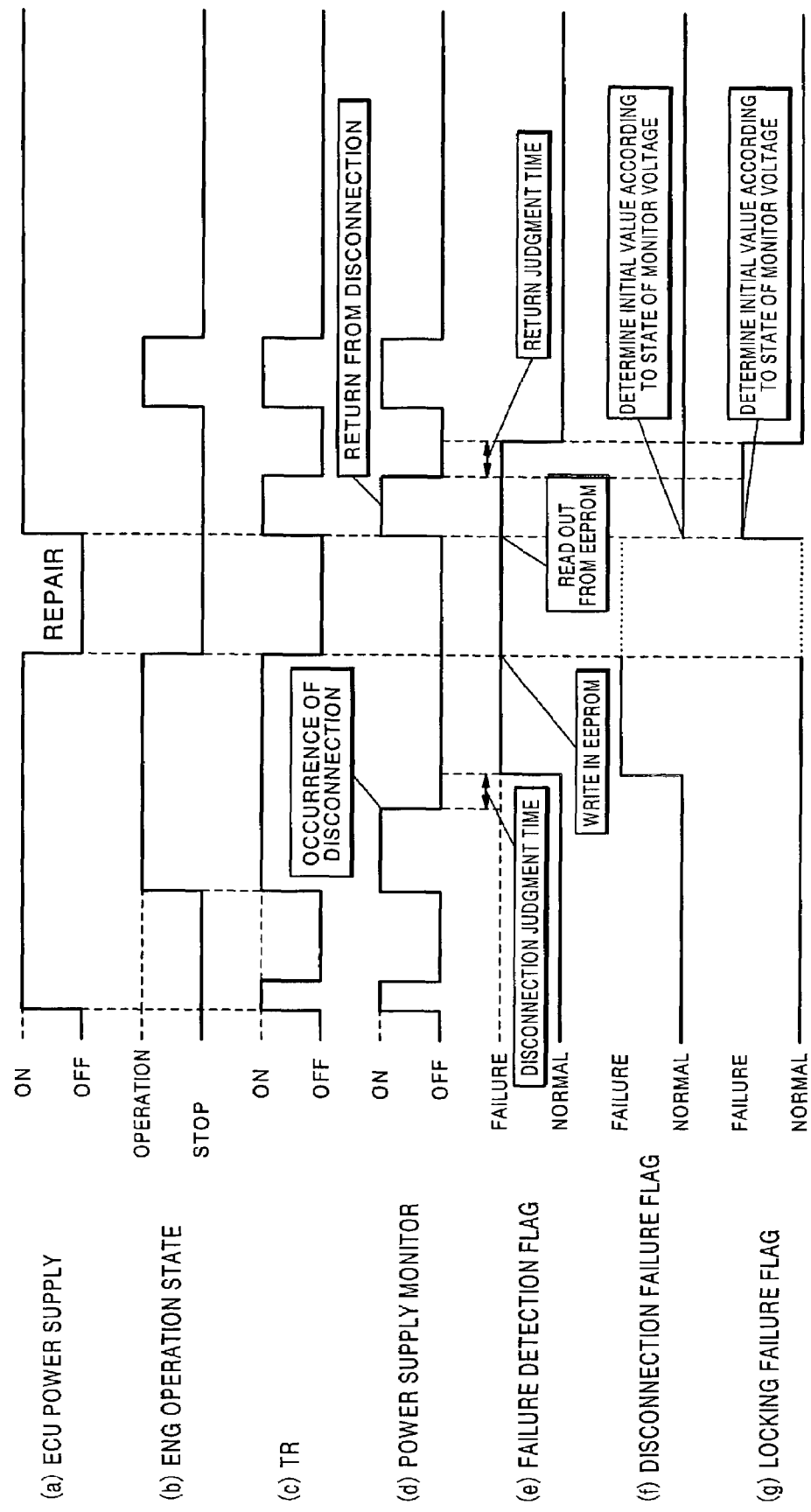
FIG. 6 is a timing chart showing operations at the time when disconnection of the failure detecting device in accordance with the first embodiment of the present invention is repaired.
Figure 7:
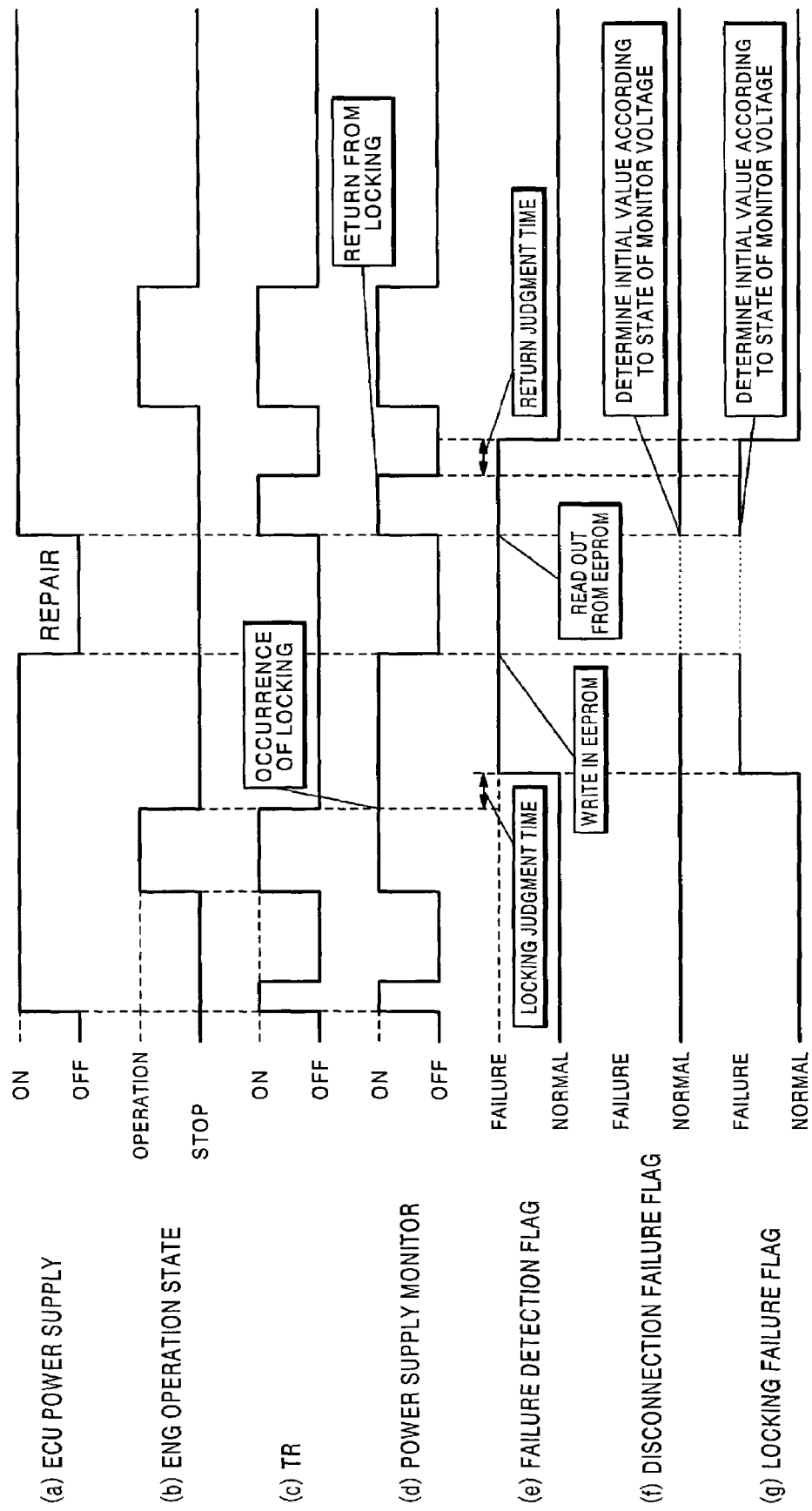
FIG. 7 is a timing chart showing operations at the time when locking of the failure detecting device in accordance with the first embodiment of the present invention is repaired.
Figure 8:
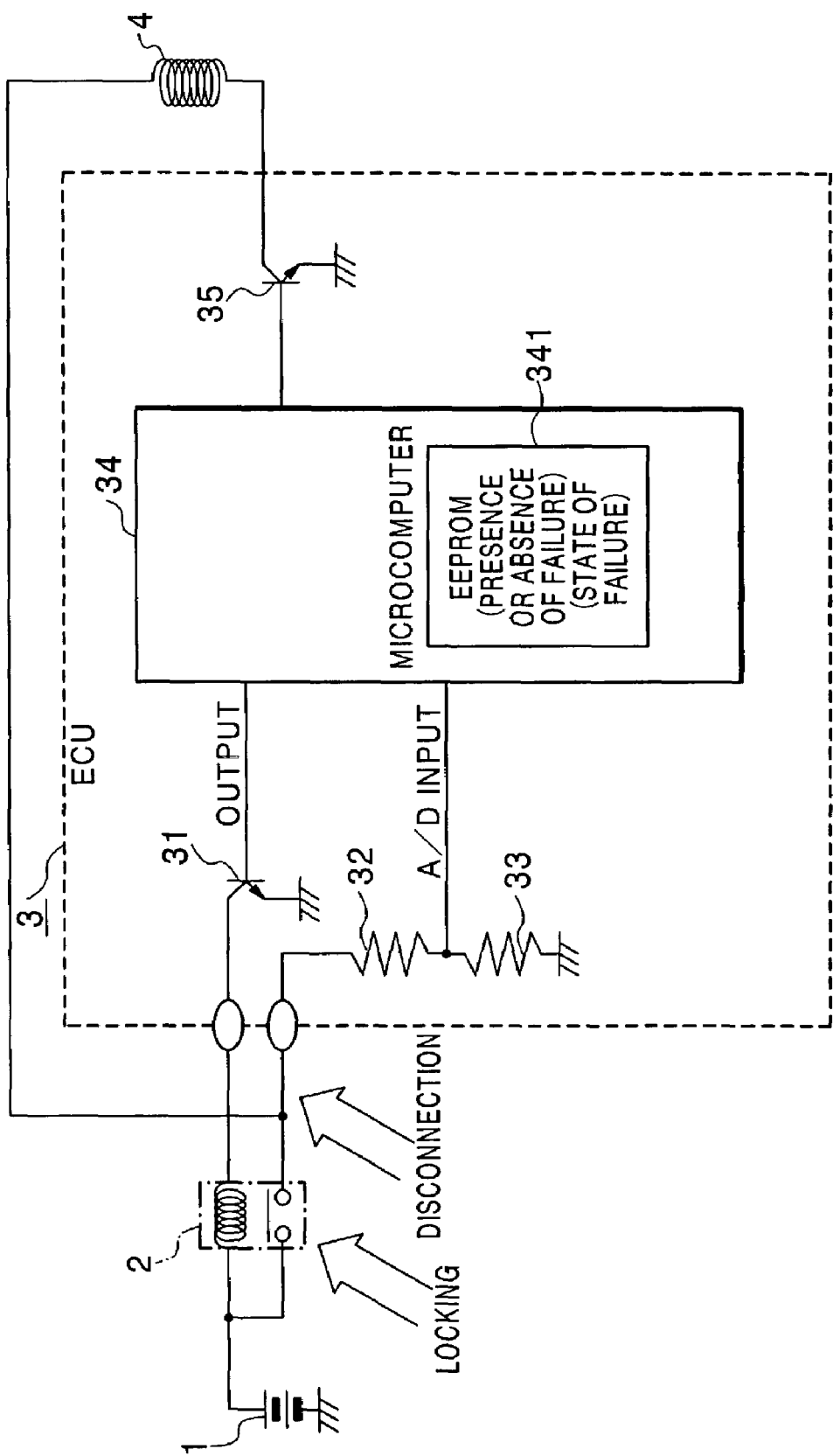
FIG. 8 is a diagram showing a structure of a conventional failure detecting device.
Figure 9:
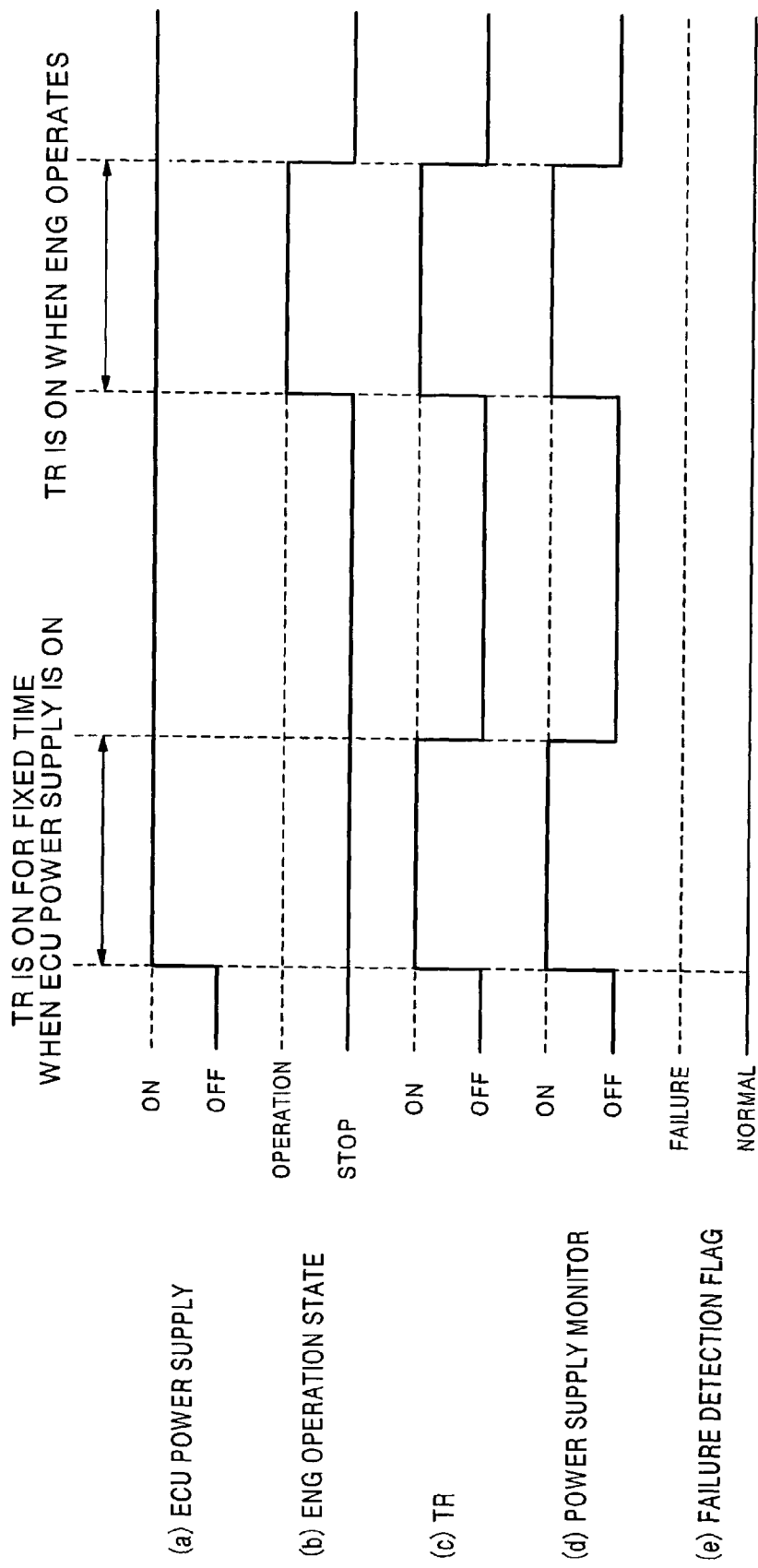
FIG. 9 is a timing chart showing basic operations of the failure detecting device.
Figure 10:
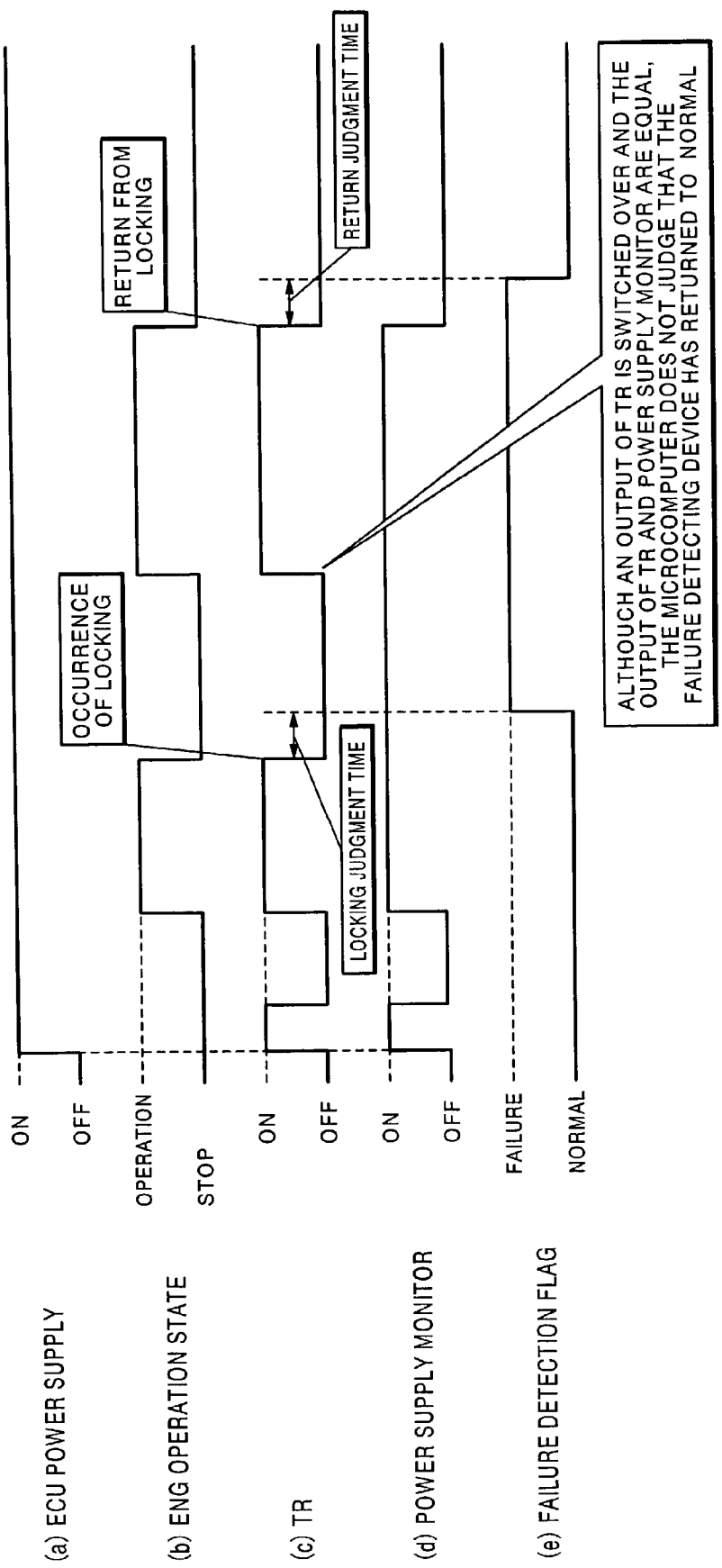
FIG. 10 is a timing chart showing operations of locking detection and return judgment of the failure detecting device.
Figure 11:
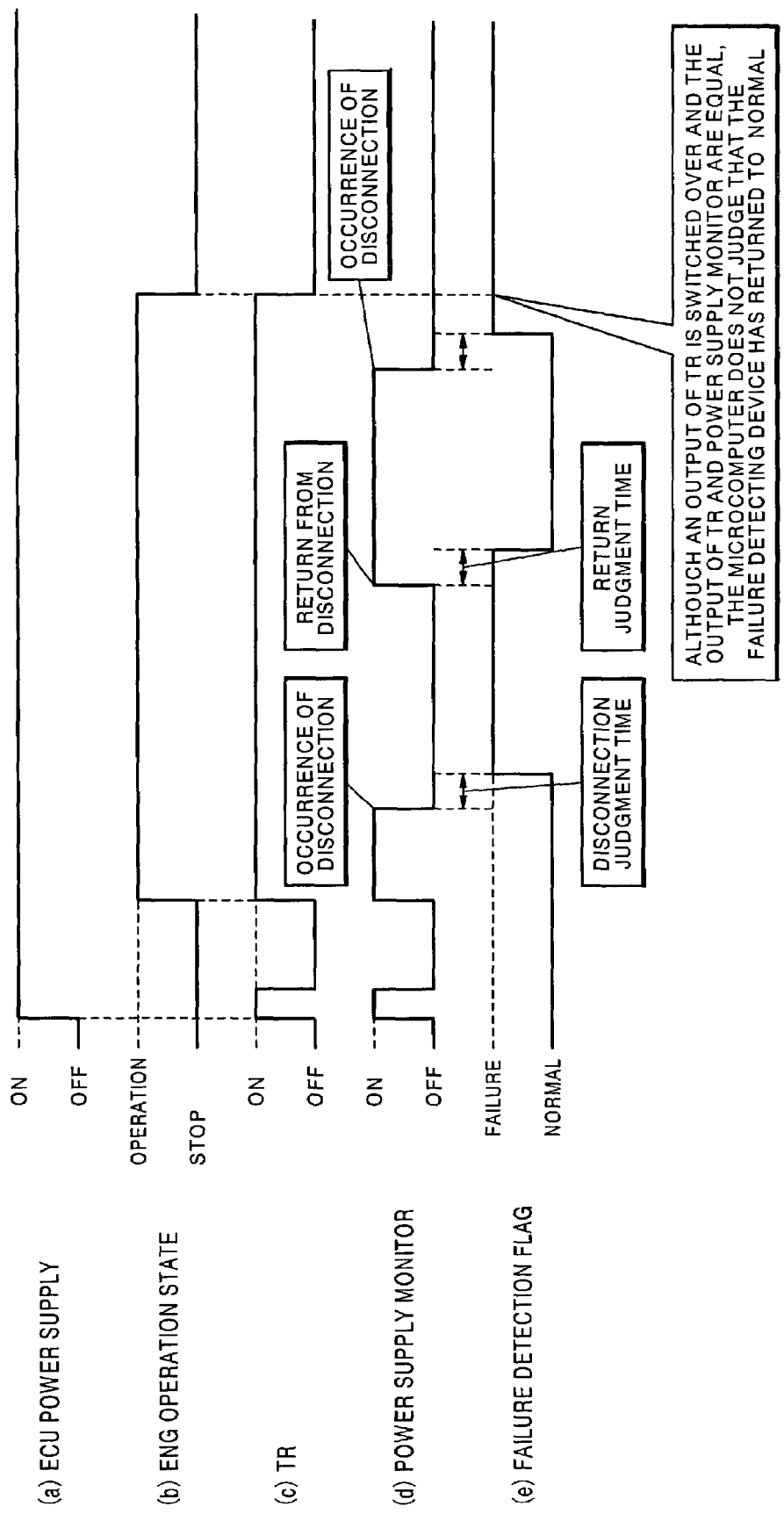
FIG. 11 is a timing chart showing operations of disconnection detection and return judgment of the failure detecting device.
Figure 12:
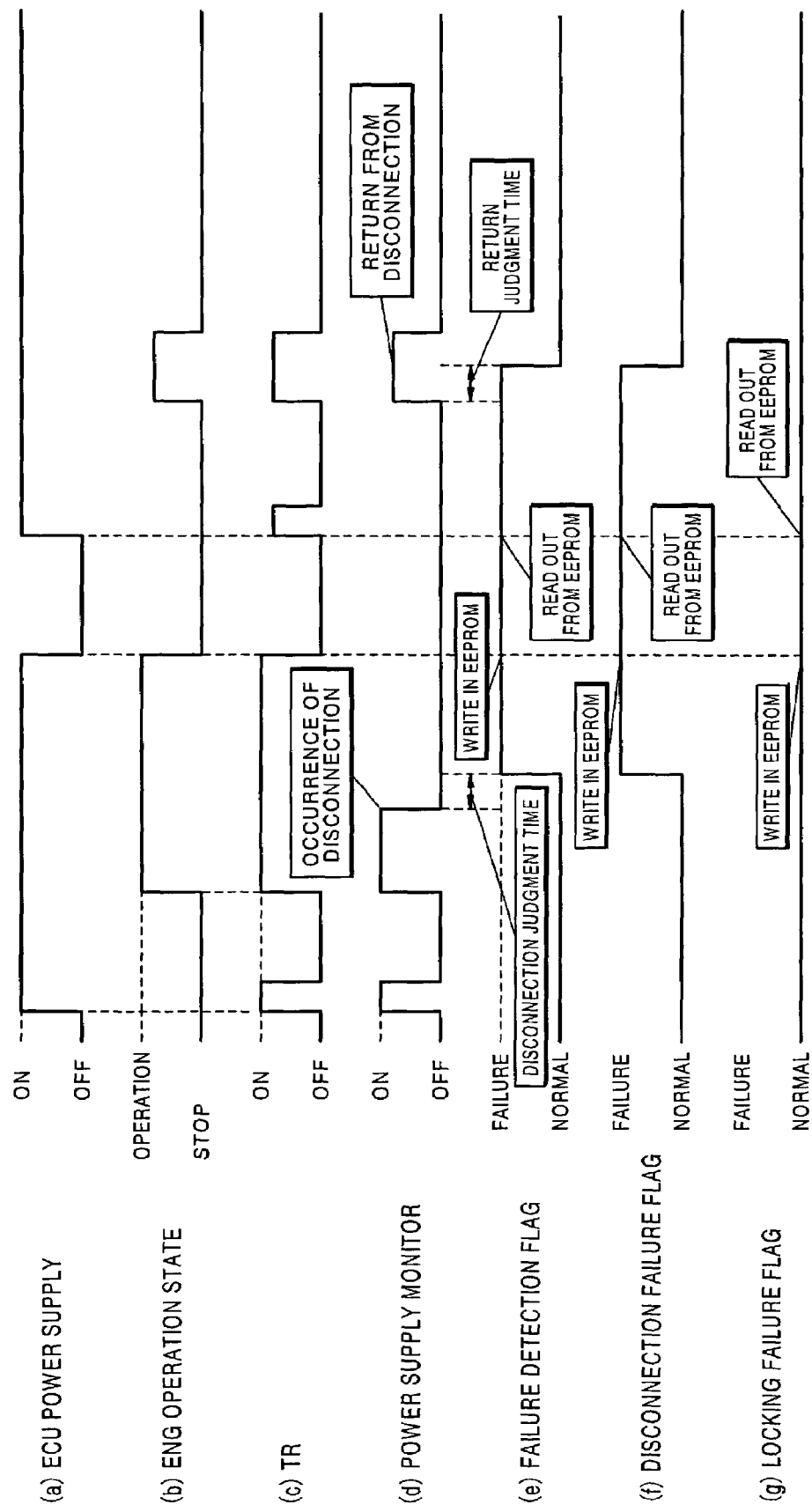
FIG. 12 is a timing chart showing operations at the time when the conventional failure detecting device is turned OFF in a disconnection state.
Figure 13:
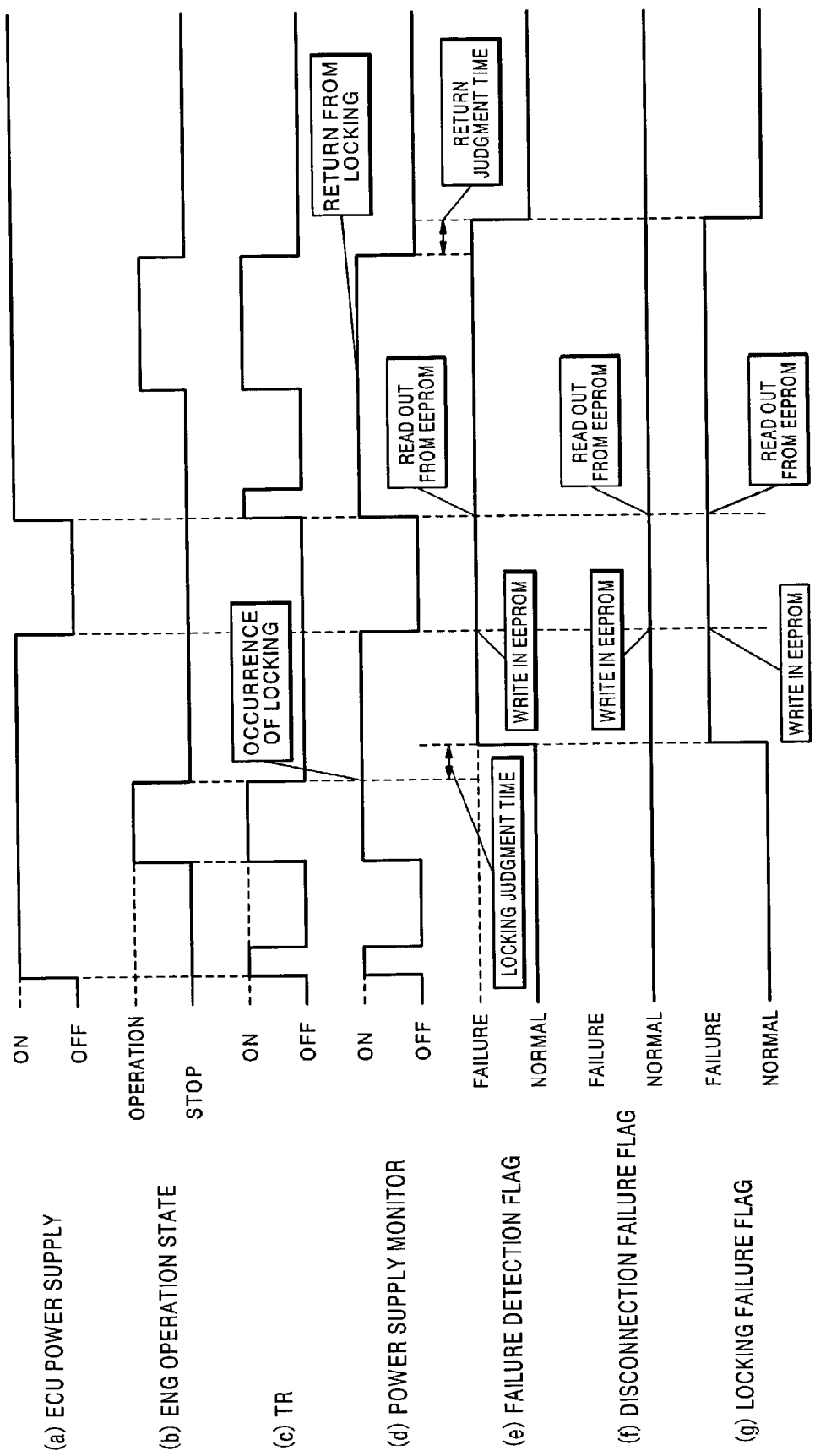
FIG. 13 is a timing chart showing operations at the time when the conventional failure detecting device is turned OFF in a locked state.
Figure 14:
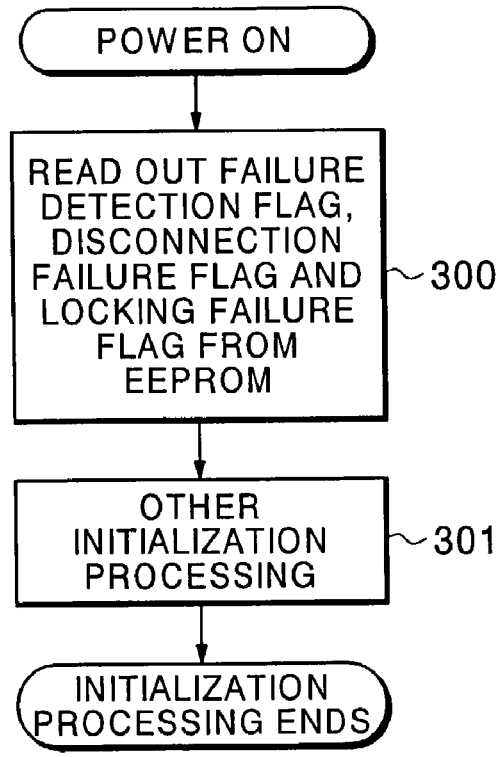
Figure 15:
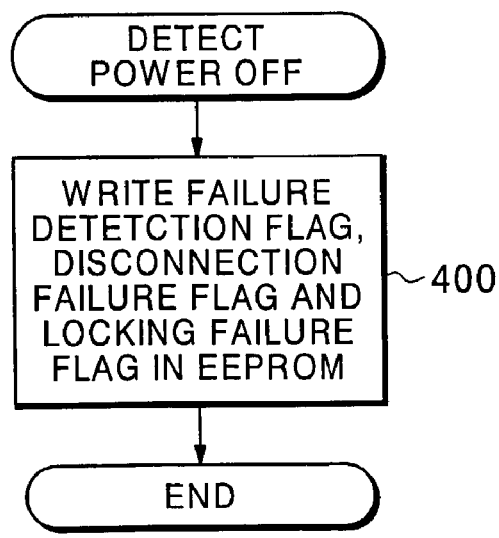
FIG. 15 is a flow chart showing operations at the time when power OFF of the conventional failure detecting device is detected.

FIGS. 6 and 7 are timing charts showing operations of return judgment at the time when the failure detecting device is repaired from the respective failure states.

FIG. 6 is a timing chart showing operations at the time when disconnection of the failure detecting device in accordance with the first embodiment of the present invention is repaired.

A voltage of the power supply monitor at the time when the power supply 1 of the ECU 3 is applied after repair starts from ON because the transistor 31 is turned ON for a fixed time after the application of the power supply. Consequently, judgment of return from the disconnection state is according to normal return conditions that are different from those at the time of failure. The purpose of this control is to not release a failure by mistake in a state in which the failure detecting device is out of order. If the failure is repaired (the failure detecting device returns to normal), it is sufficient that the failure detecting device returns from the failure state, and it is not necessary to return from disconnection by a disconnection return logic.

FIG. 7 is a timing chart showing operations at the time when locking of the failure detecting device in accordance with the first embodiment of the present invention is repaired.

At the time of locking, the ECU 3 is operated by applying the power supply 1 again, and the transistor 31 is turned OFF after being ON for a fixed time. At this point, since repair is completed, the power supply monitor are also turned OFF. When this state continues for a predetermined time (return judgment time), the microcomputer 34 judges that the failure detecting device has returned to normal. In addition, after the operation of the ECU 3, when the engine comes to be in an operation state within a fixed time, when the transistor 31 is turned OFF after the engine stops, it becomes possible to perform normal return judgement and the failure detecting device returns to normal.

Therefore, without storing the failure state in EEPROM 341A, a performance is realized with which the failure detecting device can continue failure judgement at the time of failure and can return at the time of repair in a manner equivalent to the conventional control device.

That is, the failure detecting device in accordance with the first embodiment of the present invention is provided with the transistor 31 for driving the excitation coil of the relay 2 connected to the battery 1, the resistances 32 and 33 (power supply monitor) for monitoring an output of the relay 2, the EEPROM 341A (memory device) for storing failure presence or absence information, and the microcomputer 34A (arithmetic unit) for writing the failure presence or absence information in the EEPROM 341A at the time of power OFF, reading the failure presence or absence information from the EEPROM 341A at the time of power ON, and judging a failure state based on a voltage value detected by the power supply monitor in the case in which a failure is present.

In addition, the microcomputer 34A is for judging that the failure state is locking of the relay 2 when the voltage value detected by the power supply monitor is ON and judging that the failure state is disconnection of a peripheral circuit of the relay 2 when the voltage value detected by the power supply monitor is OFF.

Thus, it is seen that a failure detecting device is provided. One skilled in the art will appreciate that the present invention can be practiced by other than the preferred embodiments which are presented for the purposes of illustration and not of limitation, and the present invention is limited only by the claims which follow.

What is claimed is:

1. A failure detecting device comprising:
   a transistor driving an excitation coil of a relay connected to a power supply;
   a power supply monitor monitoring an output of the relay;
   a memory device storing failure presence or absence information; and
   an arithmetic device writing the failure presence or absence information in the memory device when the power supply is OFF, reading the failure presence or absence information from the memory device when the power supply is ON, and judging a failure state based on a voltage value detected by the power supply monitor if a failure is present.

2. A failure detecting device comprising:
   a transistor for driving an excitation coil of a relay connected to a power supply;
   a power supply monitor for monitoring an output of the relay;
   a memory device for storing failure presence or absence information; and
   an arithmetic device for writing the failure presence or absence information in the memory device when the power supply is OFF, reading the failure presence or absence information from the memory device when the power supply is ON and judging a failure state based on a voltage value detected by the power supply monitor if a failure is present,
   wherein the arithmetic device judges that the failure condition is locking of the relay when the voltage value detected by the power supply monitor is ON and judges that the failure state is disconnection of a peripheral circuit of the relay when the voltage value detected by the power supply monitor is OFF.

3. The failure detecting device according to claim 1, wherein the failure presence or absence information indicates whether a failure occurred in a device being monitored.

4. The failure detecting device according to claim 3, wherein the device being monitored is a fuel ejection control unit.

5. The failure detecting device according to claim 1, wherein, when the information indicates a failure presence, the arithmetic device sets a state for detecting a repair from failure.

6. The failure detecting device according to claim 1, wherein, when the information indicates a failure presence, the arithmetic device sets a condition for detecting a return to a normal operation, said condition specifying a predetermined voltage value of the power supply monitor and the transistor.

7. The failure detecting device according to claim 1, wherein the information indicates a failure presence, the arithmetic device sets a condition for detecting that a repair is performed, said condition being a turning OFF of both the power supply monitor and the transistor after the power supply is turned ON.

8. The failure detecting device according to claim 7, wherein the condition detects the repair from different failure states.

* * * * *